United States Patent
Lloyd, III

[15] 3,685,305
[45] Aug. 22, 1972

[54] COLUMN STABILIZED STINGER

[72] Inventor: Samuel H. Lloyd, III, Los Angeles, Calif.

[73] Assignee: Santa Fe International Corporation, Los Angeles, Calif.

[22] Filed: Aug. 17, 1970

[21] Appl. No.: 64,267

Related U.S. Application Data

[63] Continuation-in-part of Ser. No. 22,634, March 25, 1970.

[52] U.S. Cl. ..................................... 61/72.3, 114/.5
[51] Int. Cl. ........................... B63b 35/04, F16l 1/00
[58] Field of Search ...... 61/72.3, 72.4, 72.1; 114/.5 F

[56] References Cited

UNITED STATES PATENTS

| | | | |
|---|---|---|---|
| 3,411,306 | 11/1968 | Mosby | 61/72.4 |
| 3,407,610 | 10/1968 | Wolff | 61/46.5 |
| 3,321,925 | 5/1967 | Shaw | 61/72.3 |
| 3,462,263 | 8/1969 | Moore | 61/72.4 |

Primary Examiner—Jacob Shapiro
Attorney—LeBlanc & Shur

[57] ABSTRACT

The stinger includes a base structure having a plurality of upstanding stabilizing columns on opposite sides of its pitch and roll axes and carrying pipeline supports which permit translational movement of the pipeline relative to the stinger. The stinger is pivotably secured behind the pipelaying barge and is ballasted from a low draft condition with the base structure having freeboard to a high draft condition. The pipeline supports progressively decrease in height above the base structure from the end of the segment nearest the barge whereat the pipeline is supported in the air toward the opposite end whereat the aft pipeline support disposes the pipeline below the mean waterline. The pipeline centerline extending along the supports defines a radius of curvature at least equal to and preferably much greater than the minimum allowable radius of curvature for the pipeline. The stinger is preferably configured such that the combined natural frequency of the stinger and pipeline match as nearly as possible the natural frequency of the pipelaying barge.

18 Claims, 13 Drawing Figures

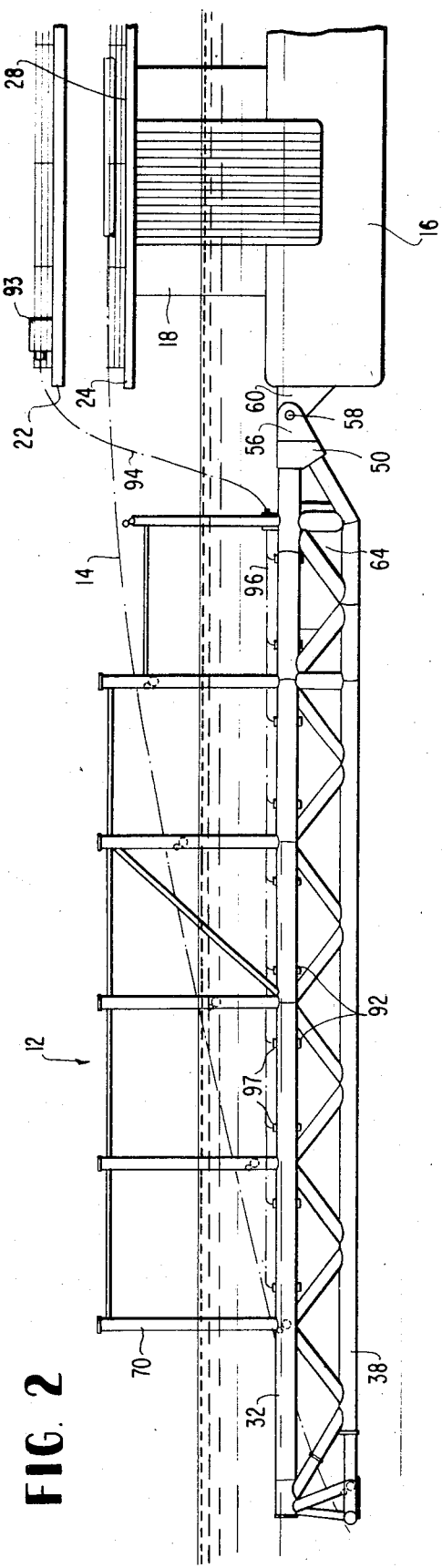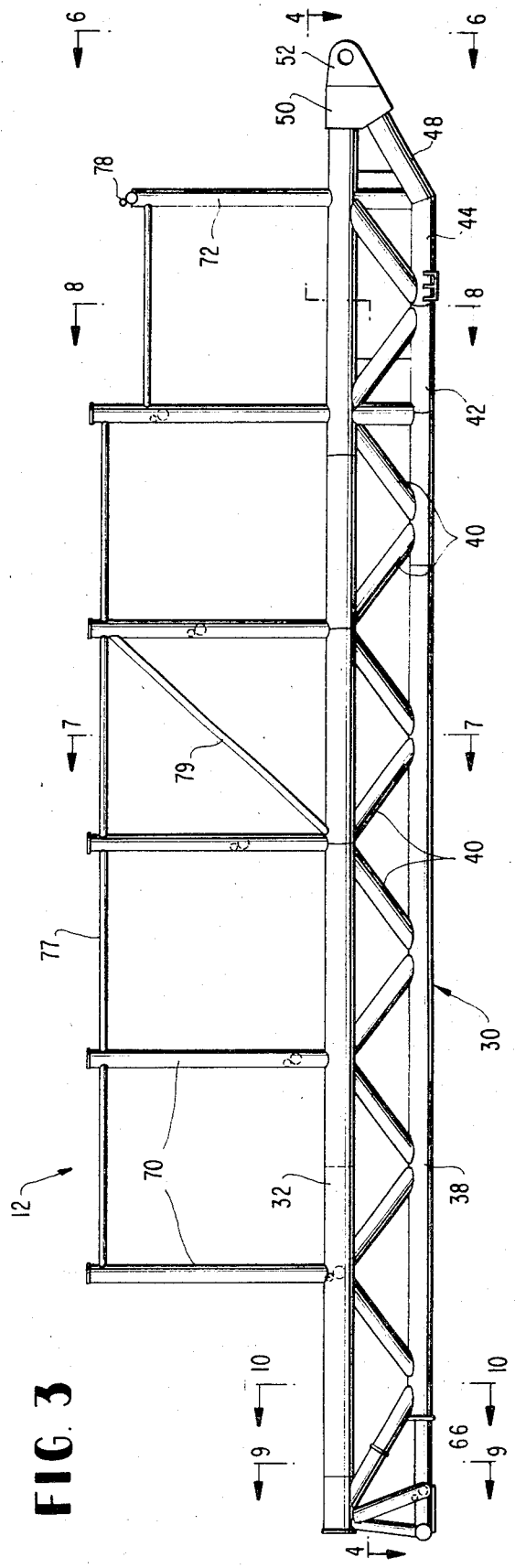

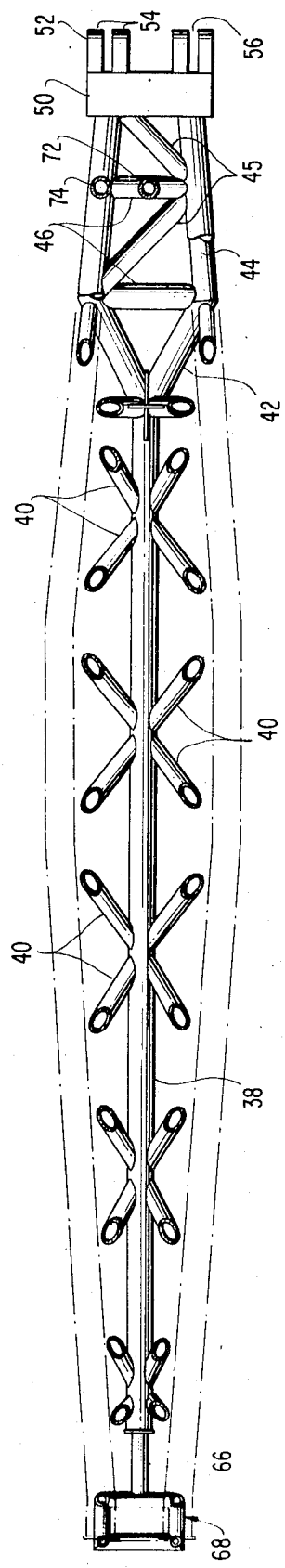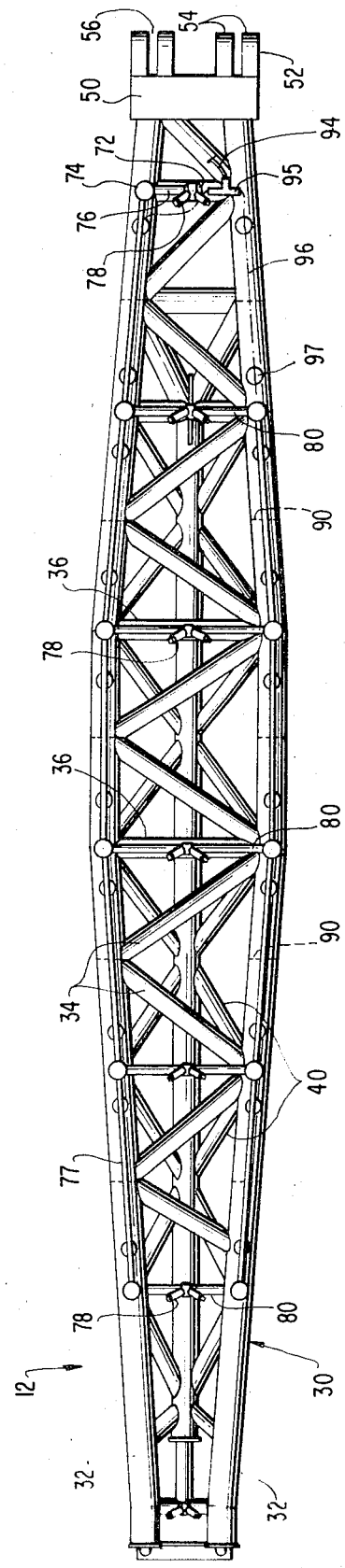

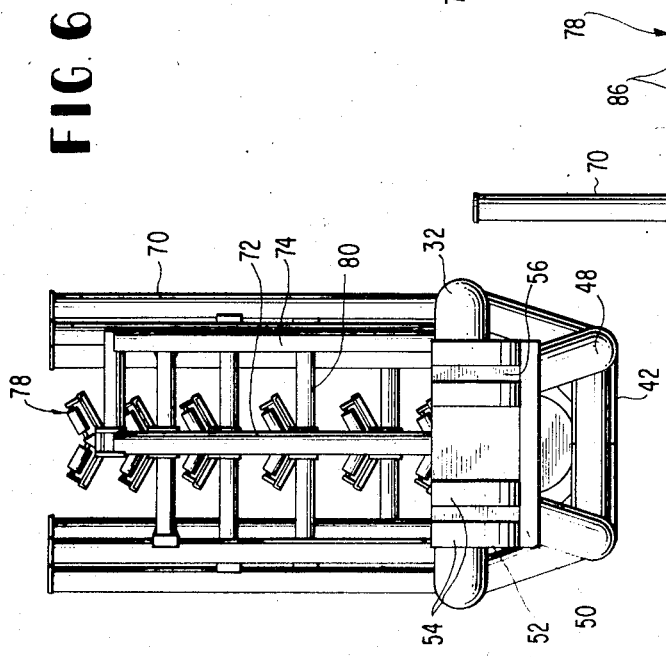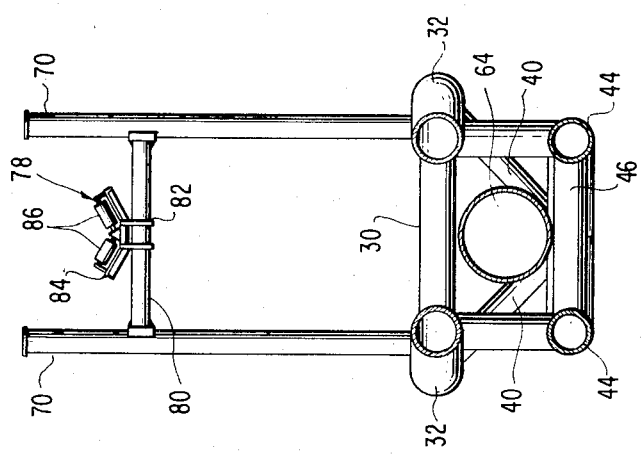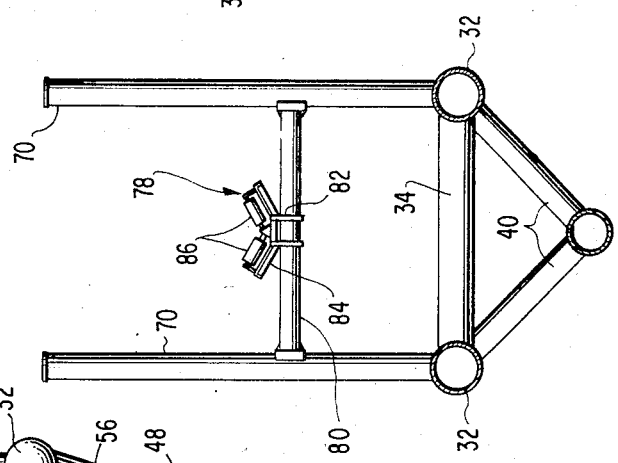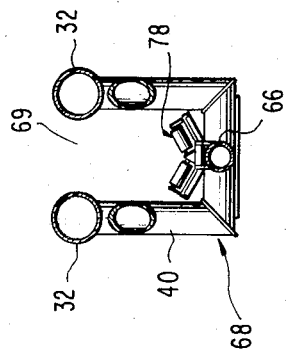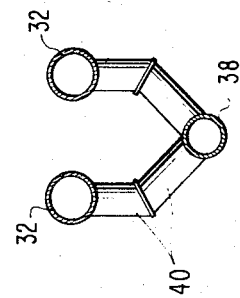

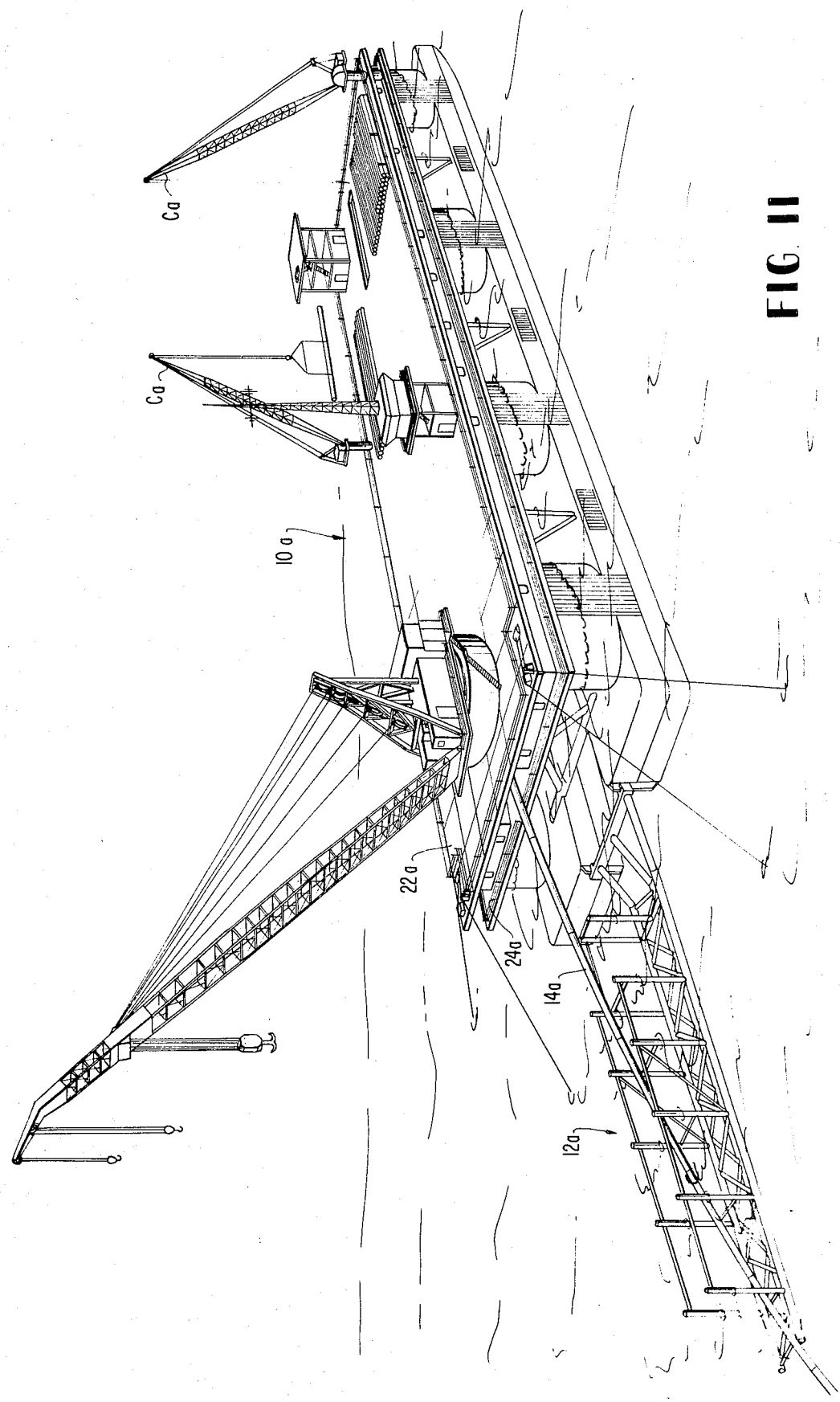

COLUMN STABILIZED STINGER

This application is a continuation-in-part of my copending application Ser. No. 22,634 filed Mar. 25, 1970.

The present invention relates to a subaqueous pipe and cable laying apparatus and particularly relates to a column stabilized stinger for pipe or cable laying barges having elevated working platforms.

Increased activity in offshore gas and oil exploration and development has created an insistent demand for cables and pipelines connecting the offshore sites with onshore terminals. For example, it is often desirable to directly connect an offshore oil producing well with an onshore terminal by means of a pipeline laid along the sea floor whereby oil issuing from the well may be directly communicated to the onshore terminal. Apparatus for laying pipelines along the sea floor has been provided in the past and oftentimes includes pipelaying barges whereon the pipes are connected one to the other and then payed out from the barge for disposition on the seabottom as the barge advances. Pipelines, of the type commonly employed for this purpose, are capable of resisting bending stresses within predetermined limits. Such stresses would not normally be exceeded in shallow water pipelaying operations. However, as the water depth increases, the length and hence weight of pipe which must be supported from the pipelaying barge increases with the pipeline obtaining a generally S-shaped configuration between the barge and the seabottom, the radiuses of curvature of the pipe tending to decrease as the distance between the barge and seabottom or water depth increases. Hence, there is a limit to the radius of curvature which a specified pipeline can obtain without incurring bending stresses exceeding the maximum allowable bending stresses for that particular pipeline and which stresses would result in rupture of the pipeline.

Stingers have been employed in the past in efforts to overcome the foregoing and other problems associated with laying subaqueous pipelines, particularly in deep water. Stingers, either fixed or articulated, comprise devices used to support the pipeline after it has been payed out from the barge and prior to its disposition on the seabottom. Conventionally, the stinger connection to the pipelaying apparatus, which is normally a surface floating barge, is located at or near the operating waterline of the lay barge. An inclined ramp is conventionally constructed on the lay barge to assist in obtaining the proper curvature of the pipeline as it enters the stinger, the ramp usually terminating at the operating waterline. The inclined ramp, however, reduces the available work space on the lay barge due to its disposition near the waterline. More importantly, the surface floating pipelaying barge is subject to wind and wave action which causes excessive barge and stinger motion. As is usually the case, pipelaying operations must be terminated in medium to high seas (waves in excess of 4 or 5) due to large heave motions of the stinger and pipelaying vessel and mismatched vertical motion between the pipelaying barge and the stinger due to wave action. When large heave motions are obtained, there is increased likelihood that the pipeline will exceed its allowable bending stress and rupture.

Accordingly, it is desirable to employ a pipelaying vessel which has minimum motion response to wave excitation forces whereby the vessel can be substantially motionless even in high seas. Such a vessel having a minimum motion characteristic is disclosed in my U.S. Pat. application Ser. No. 705,175, filed Feb. 13, 1968 and is characterized by the provision of a plurality of stabilizing columns having a base flotation structure at their lower ends and a work platform adjacent their upper ends. This vessel is supported in a low draft condition by the base flotation structure and in a high draft condition, by preferably ballasting the base structure, by the residual displacement of the base structure and the submerged portion of the columns. In the high draft condition with the mean waterline located intermediate the height of the columns and with the base structure fully submerged, the vessel obtains minimum motion response to wave action. As a necessary condition to its effective employment, the work deck of this vessel must be elevated a considerable distance above the mean waterline (even in the high draft condition the work deck is about 15 to 20 feet above the mean waterline). Apart from the foregoing, it has also been found desirable to maintain the work area or platform on which the pipeline sections are connected one to the other and from which the sections are payed out onto the stinger well above the mean waterline such that work can be efficiently conducted and continued even during heavy seas. Thus, when employing a column stabilized vessel for pipelaying operations on which the work platform is both necessarily and desirably elevated above the mean waterline in the high draft column stabilized condition of the vessel or when a conventional ramp-less barge is employed wherein the work area for connecting and paying out the pipe sections is elevated a significant distance above the mean waterline, there is a large length of pipeline which must be supported in the air from the elevated after deck portion of the column stabilized or ramp-less pipelaying barge to the point at which the pipeline enters the water (in addition to the portion of the pipeline extending from the surface of the water to the seabottom). A conventionally constructed stinger cannot be employed by itself for this purpose as it is simply not designed to provide support for and transition of the pipeline from an elevated work deck through the air to its point of entry into the water. Also, the frequency response of the conventional stinger (having relatively large waterplane area) to wave action would not normally be the same as or bear any relation to the frequency response of the pipelaying barge to wave action and this would result in mismatched heave motions deleterious to effective pipelaying operations particularly in heavy seas.

Accordingly, it is a primary object of the present invention to provide a novel stinger for subaqueous pipeline laying operations from a lay vessel having an elevated work deck.

It is another object of the present invention to provide a column stabilized stinger for supporting a pipeline as it is payed out from a pipelaying vessel in a manner to minimize and substantially eliminate heave motions of the pipeline due to excitation forces caused by wave action on the pipelaying barge and stinger.

It is still another object of the present invention to provide a column stabilized stinger for supporting the air length of a pipeline between the elevated work area of a pipelaying barge and the point of entry of the pipeline transition into the water as well as for supporting an immersed portion of the pipeline in a manner to substantially preclude rupture of the pipeline due to relative motion of the pipelaying barge and the ground supported pipeline.

It is a further object of the present invention to provide a column stabilized stinger having a natural frequency matched as nearly as possible to the natural frequency of the accompanying pipelaying barge when in a pipeline supporting condition to preclude relative motion between the pipelaying barge and the stinger due to wave action on both the barge and stinger.

It is a still further object of the present invention to provide a column stabilized pipelaying barge and a column stabilized stinger configured to minimize barge and stinger motion due to excitation forces thereon caused by wave action (hereinafter called "motion minimizing characteristics").

These and further objects and advantages of the present invention will become more apparent upon reference to the following specification, claims and appended drawings, wherein:

FIG. 2 is a fragmentary side elevational view thereof;

FIG. 3 is a side elevational view of one form of a column stabilized stinger constructed in accordance with the present invention;

FIG. 4 is a cross-sectional view thereof taken generally about on line 4—4 of FIG. 3;

FIG. 5 is a top plan view of the stinger hereof;

FIG. 6 is an end elevational view of the stinger hereof;

Figure 12:
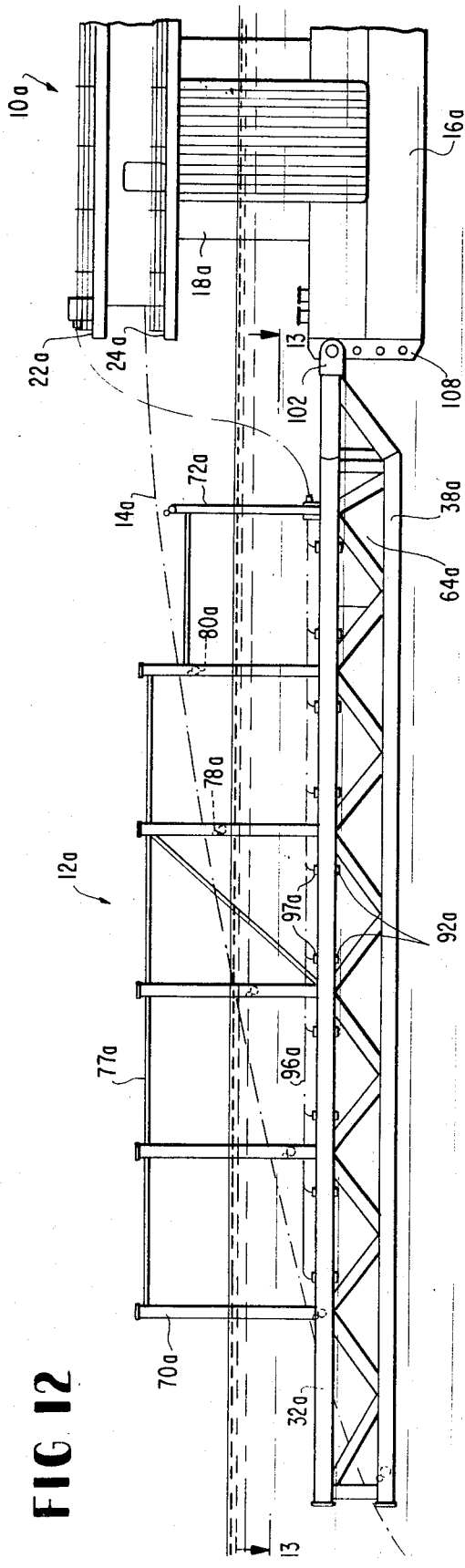

FIGS. 7, 8, 9 and 10 are cross-sectional views thereof taken generally about on lines 7—7, 8—8, 9—9, and 10—10 respectively in FIG. 3;

FIG. 11 is a perspective view of another form of pipelaying apparatus hereof;

FIG. 12 is a fragmentary side elevational view thereof; and

Figure 13:
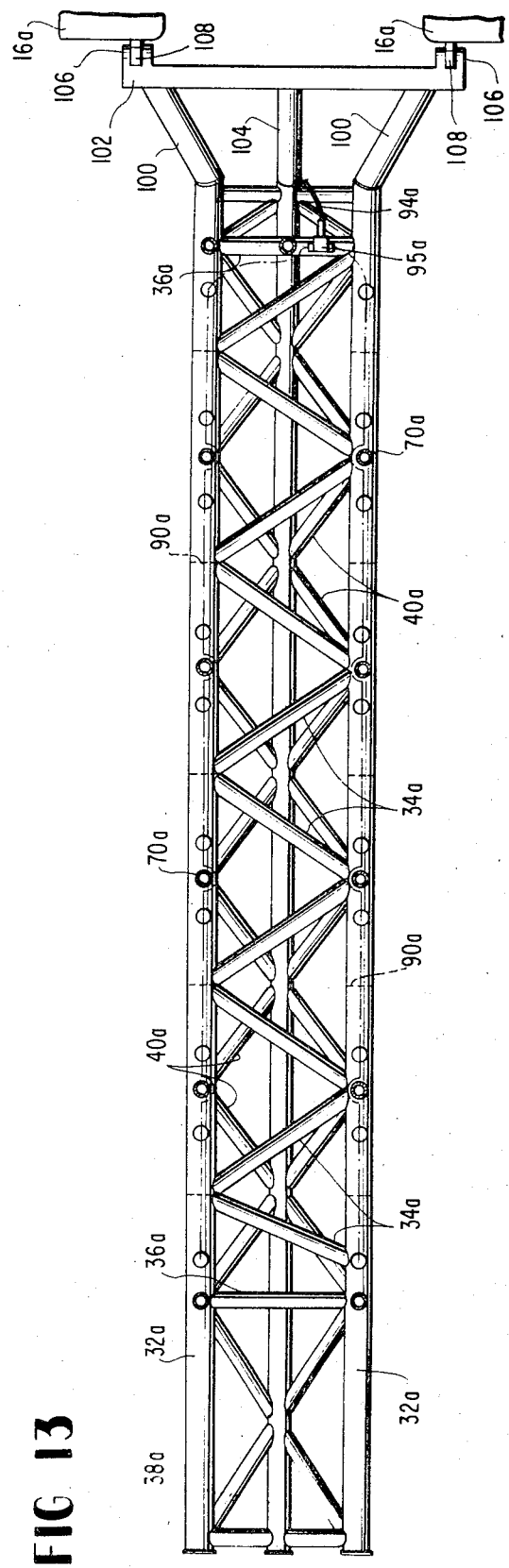

FIG. 13 is a fragmentary cross-sectional view thereof taken about on line 13—13 in FIG. 12.

Figure 1:
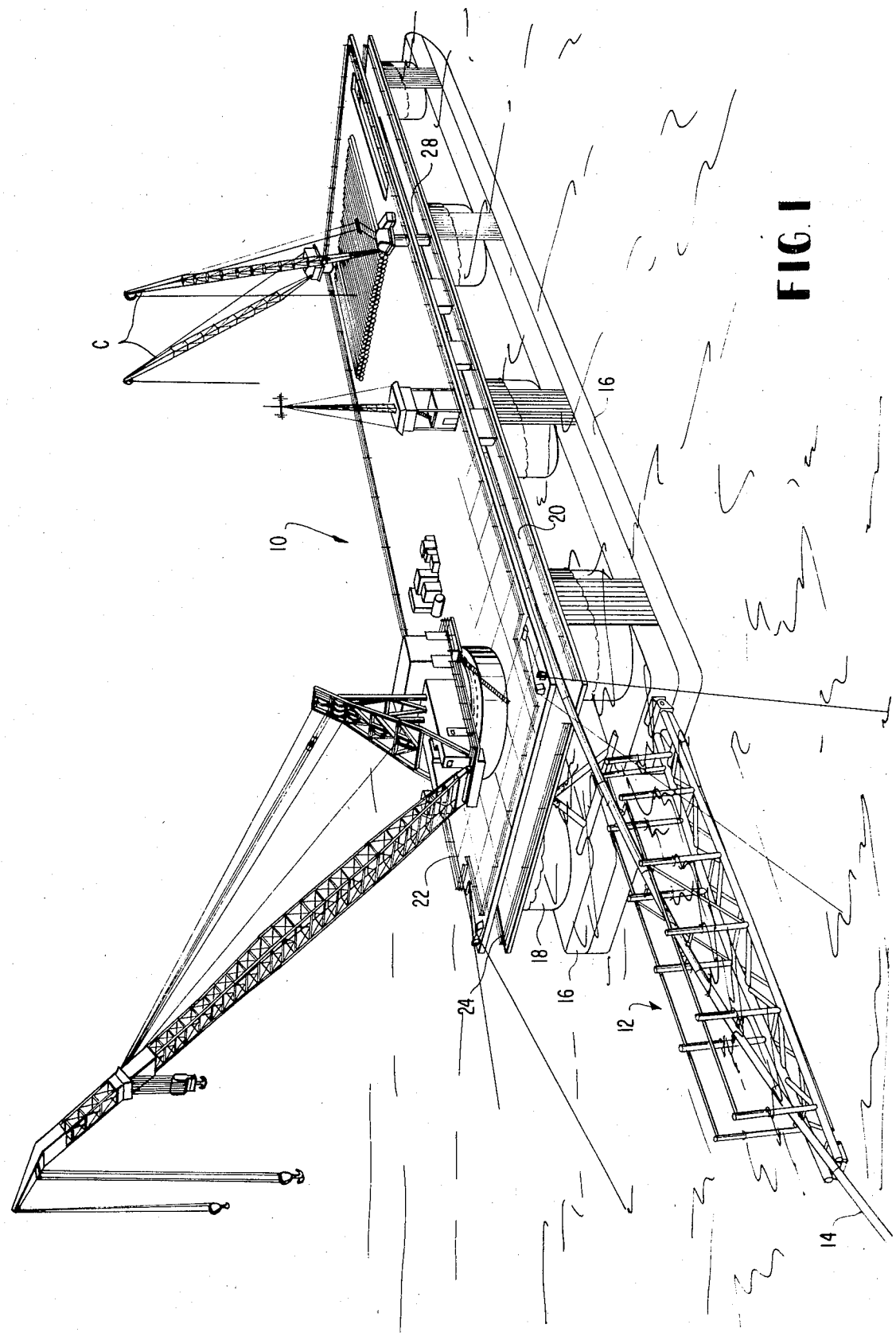
FIG. 1 is a perspective view illustrating one form of a pipelaying apparatus constructed in accordance with the present invention.

Referring now to FIG. 1, there is illustrated a form of the present invention in which a pipelaying barge, generally indicated 10, is illustrated towing a column stabilized stinger, generally indicated 12 for laying pipeline indicated 14. In the form of the invention illustrated in FIG. 1, the pipelaying barge is, per se, a column stabilized barge and may be of the type disclosed in copending application Ser. No. 705,175 filed Feb. 13, 1968 of common assignee herewith, the disclosure of which application is incorporated herein by reference as though herein fully set forth. Briefly, pipelaying barge 10 comprises a pair of transversely spaced elongated hulls 16 each carrying a plurality of upstanding stabilizing columns 18. Columns 18 support a work platform 20 adjacent their upper ends, platform 20 lying in spaced relation above hulls 16 a predetermined height at least equal to the maximum anticipated wave height and preferrably comprising upper and lower decks 22 and 24 respectively. The hulls 16 include ballast compartments, not shown, and barge 10 is configured such that it floats in an unballasted low draft condition with the hulls having freeboard when in transit between work sites, with the mean waterline M.W.L lying below the top side of the hulls 16. At a work site, for example, astride a track along the seabottom on which pipeline is to be laid, the hull compartments are ballasted to submerge the hulls and portions of columns 18 such that the mean waterline is located at approximately one-half the effective height of columns 18 as illustrated whereby a high draft condition and substantial transparency to wave action is obtained. Furthermore, the cross-sectional area and configuration of columns 18, the weight distribution of barge 10 and the geometry of submerged hulls 16 are such as provide vessel motion minimizing characteristics in roll, pitch, and heave in the high draft condition illustrated in FIG. 1. That is to say, barge 10 is configured to provide minimum motion response to wave excitation forces in the high draft condition. Additionally, the vessel is configured to have long natural periods in heave, pitch and roll in the high draft condition and which periods are beyond the range of anticipated wave periods as to avoid motion amplification due to interaction of vessel and wave motion. It will be appreciated that auxiliary equipment including cranes C for storing, manipulating, racking, connecting, etc. the various pipe sections to be laid are carried by pipelaying barge 10 on work platform 20 and that in the ballasted high draft pipelaying condition the work platform 20 remains elevated a substantial distance above the mean waterline, for example, on the order of 15 to 20 feet. Particularly, the pipe sections P.S. stored on upper deck 22 are lowered by cranes C through an opening 26 in upper deck 22 for disposition in a work area generally indicated 28 along one side of the vessel on lower deck 24, the assembled pipeline being payed out from the between deck work area aft onto the stinger 12 for disposition on the seabottom. Thus, by locating the assembly area for the pipe sections between decks 22 and 24, the workmen can work in an enclosed protected area. Further, by such disposition, the height of the pipe above the mean waterline is reduced as compared with dispensing the work area in the open on deck 22 and this reduces the design requirements for the stinger as discussed hereinafter. Also, it is desirable in pipelaying operations conducted in deep water to apply a predetermined axial tension to the pipeline in order to reduce the curvature of the generally S-shaped pipeline portion which extends between the pipelaying apparatus and the seabottom. To this end, a plurality of rollers, not shown, can be disposed in the work area 28 on lower deck 24 in a position engaging about the pipe. The rollers can be controlled by a suitable drive mechanism, not shown, to provide a constant tension on the pipe thereby to increase the radius of curvature of the depending pipeline in comparison with the radius of curvature of an un-tensioned pipeline. As will be appreciated, the pipeline is thus laid in tension with the barge being periodically stopped such that additional pipe sections can be added and secured to the pipeline and advanced such that the additional sections can be payed out from the barge. For purposes of this application, the term pipeline as employed herein is intended also to include one or more cables within its scope.

Referring now to FIGS. 2, 3 and 4, stinger 12 is preferably an all steel tubular welded construction including a generally triangularly shaped base or hull structure 30 having a pair of transversely spaced elongated tubular or pontoon-like members 32 connected one to the other by a plurality of diagonally disposed cross tubular members 34 and a pair of transversely extending tubular members 36 located centrally of stinger 12. The elongated members 32 converge inwardly toward one another at opposite ends of stinger 12 with a central portion of members 32 between cross members 36 lying generally parallel one with the other. Tubular members 32 are generally symmetrical with respect to one another about a longitudinal axis. A lower centrally disposed tubular keel 38 depends from tubes 32 by a framework including a plurality of diagonally extending inwardly inclined tubular braces 40 connecting between central tube 38 and respective tubular members 32. Keel 38 extend short of the opposite ends of stinger 12 and its forward end is connected to a pair of outwardly diverging tubular members 42. The forward ends of members 42 are, in turn, connected with a pair of transversely spaced forwardly and inwardly converging tubular members 44, members 42 and 44 lying in a common substantially horizontal plane. Suitable diagonally and transversely extending cross braces 45 and 46 respectively are provided between members 44 and their forward ends are connected with upwardly inclined tubular members 48 (FIG. 3). The forward ends of tubular members 32 and members 48 are connected to a transversely extending cross member 50 carrying a pair of laterally spaced hinge mountings 52. Specifically, each hinge mounting 52 includes a pair of vertically extending spaced plates 54 having registering openings 56 for receiving hinge pins 58 for connecting the stinger to the barge 10. Particularly, as seen in FIGS. 1 and 2, the barge 10 includes a pair of transversely spaced, vertically extending plates 60 carried on the hull 16 below work area 28, the plates 60 having openings and being receivable between the plates 54 of hinge mountings 52 with hinge pins 58 providing the stinger to barge coupling. A cylindrical flotation tank 64 is disposed between and below members 32 above members 44 to provide additional buoyancy to stinger 12.

Turning now to the aft end of stinger 12, keel 38 has a reduced diameter extension 66 connected to a tubular subassembly 68 having a rectangular plan form as seen in FIG. 4. A plurality of upwardly and inwardly inclined tubular members 67 are connected at their lower ends to the corners of rectangular subassembly 68 and are connected at their upper ends to the aft end portions of tubular members 32. As seen particularly in FIG. 9, this arrangement provides an upwardly opening channel shaped slot 69 at the aft end of stinger 12 whereby pipeline can issue from stinger 12 from a point directly above the lowermost portion of stinger 12.

As specifically illustrated in FIGS. 3, 7 and 8, there is provided a pipeline supporting and stinger stabilizing structure upstanding from the base or hull structure 30. This upstanding structure includes a plurality of stabilizing columns 70 suitably secured at their lower ends to the tubes or pontoon-like members 32. Columns 70 extend upwardly from the upper surface of base structure 30 an effective height which may be equal to and is preferrably greater than the maximum anticipated wave height, i.e., the vertical distance between wave crest and trough. In the preferred embodiment, five pairs of columns 70 are equally longitudinally spaced one from the other along base structure 30 with the column arrangement on each tube or pontoon-like member 32 being symmetrical with respect to the column arrangement on the other tubular or pontoon-like member 32. As illustrated in FIGS. 3 and 5, columns 70 are preferably circular in cross section and constant in cross-sectional area throughout their effective height. Columns 70 provide for motion minimizing characteristics when the stinger segment lies in a semisubmerged high draft operating condition as described hereinafter and provides stability to the stinger when disconnected from the barge. The upstanding structure also includes a forward pair of columns 72 and 74 having like characteristics as columns 70. Column 72 is however disposed on the centerline of stinger 12 on a cross tubular member 76 connecting between members 32 whereas column 74 upstands from one of the longitudinal members 32. Longitudinally extending support struts 77 extend between the upper ends of columns 70 on opposite sides of stinger 12. Also, a pair of diagonal tubular supports 79 connect between members 32 and the central longitudinal support member 77 to reinforce the pipeline support structure.

A plurality of pipeline supporting carriages, generally indicated at 78 are preferably mounted along the longitudinal centerline of stinger 12 on support members 80 which preferably extend transversely between corresponding stabilizing columns 70 upstanding from the tube-like members 32. A similar carriage is carried by columns 72 and 74 at the forward end of stinger 12 and on the rectangular subassembly 68 at the aft end of stinger 12. At best illustrated in FIGS. 7–8, each pipeline support carriage 78 includes a base 82 secured to its associated support member 80. Base 82 mounts a pair of laterally upwardly inclined supports 84, which, in turn, mount laterally inclined rollers 86. By inclining rollers 86 as illustrated, there is formed a trough for receiving the pipeline whereby the latter is maintained against lateral movement relative to stinger 12 on pipeline support carriages 78. Pipeline support rollers 86, of course, permit translational movement of the pipeline relative to stinger 12 for disposition on the seabottom.

As illustrated in FIG. 3, the pipeline support carriages 78 are carried by the stabilizing columns 70 in a progressively decreasing height above the base structure 30 from the end of the stinger nearest the pipelaying vessel toward the opposite end of the stinger whereat the aft pipeline support carriage is disposed below members 32 such that a curved line extending along carriages 78 has a radius of curvature at least equal to and preferably greater than the minimum allowable radius of curvature for the particular pipeline portion carried by the stinger. That is to say, the pipeline supporting carriages 78 support the pipeline in a manner such that the radius of curvature of the pipeline portion is always greater than that radius of curvature which would permit bending stresses on the pipeline in excess of the maximum allowable bending stress. The carriage support member 80 are preferably adjustable in height along the columns relative to base structure 30, by means not shown, whereby the radius of curvature of the portion of the pipeline extending over the carriages 78 can be preselected, if desired, in accordance with the characteristics of the pipeline being laid to avoid pipeline rupture.

Referring now to FIG. 5, it will be seen that each of the pontoon-like members 32 is compartmented to form a plurality of ballast chambers 90 for varying the draft of stinger 12. Any number of chambers 90 can be provided as desired to perform the intended ballasting and deballasting function and each chamber is provided with a remotely controlled valve 92 for selectively opening and closing the associated chamber to the surrounding sea. The ballasting and deballasting of the stinger is preferably controlled from the pipelaying barge. To this end, and in addition to suitable conventional controls, not shown, for operating valves 90 remotely, there is provided a suitable air pump, schematically illustrated at 93 in FIG. 2 in communication with each chamber 90 by a conduit 94 which, through a tee connection 95, lies in communication with a pair of conduits 96, each serving the compartments 90 in the respective tubular member 32. Conduits 95 and 96 serve as both exhaust lines for permitting air to vent from compartments 90 when ballasting stinger 12 and supply lines for introducing air into compartments 90 when deballasting stinger 12 in a manner and for reasons to be described. Suitable remotely controlled valves 97 are provided in air lines 95 to selectively vent compartments 90 and to provide communication between pump 93 and compartments 90.

In use, stinger 12 is coupled to the pipelaying barge 10 by hinge connections 54, 56 and 60. In the normal transit condition to a work site, for example, in transit to an area where pipeline is to be laid, the barge 10 is maintained in an unballasted low draft condition whereby the hulls 16 support the barge in the water and float with freeboard. Similarly, the stinger 12 is also maintained in an unballasted condition whereby the base or hull structure 30 supports stinger 12 in the water in a low draft condition with the tubular hull members 32 floating with freeboard. At the work site, both the ballast compartments in the barge 10 and in the stinger 12 are ballasted to submerge the respective hulls 16 and base structure 30 such that the columns 18 on barge 10 and columns 70 and 72 on stinger 12 are submerged for approximately one-half their effective height, thereby locating the mean waterline above the upper surface of the hulls 16 and base structure 30. The ballasting of stinger 12 is accomplished by remote actuation of valves 92 to permit ingress of sea water into compartments 90 while the air valves 97 are also remotely actuated to vent air from ballast compartments 90 through lines 94 and 96 to atmosphere at pump 93 (a suitable valve, not shown, being provided at pump 93) and thereby permit the ingress of ballast water.

When the barge and stinger are ballasted to their working draft conditions, the pipeline carried by the barge can then be assembled on the work area 28 and payed out onto the carriage supports 78 and through the slot 72 at the aft end of stinger 12 for disposition on the seabottom. As the pipeline is initially payed out from barge 10 onto carriage supports 78, the remotely actuated valves 92 are opened to provide free communication between the surrounding seawater and compartments 90 and valves 97 are actuated to connect the air pump to air lines 94 and 96. The compartments 90 are progressively deballasted as additional pipeline is payed out from the barge onto stinger 12. By progressively deballasting compartments 90 as additional pipeline is disposed onto stinger 12, the latter is maintained in a predetermined column stabilized high draft position relative to the pipelaying barge 10 and the draft of stinger 12 is not substantially altered as the weight of the additional pipeline is added thereto.

It will be appreciated that the displacement of the submerged portions of columns 70, 72 and 74 and the residual displacement of the base structure 30 are adequate to maintain stinger 12 in a floating semisubmerged or high draft condition supporting the pipeline on carriages 78. In this manner, wave action is prevented from acting against base structure 30 and acts only on columns 70, 72 and 74 and the pipeline support structure in the open frame area between columns 70, 72 and 74 and above base structure 30. This reduces the adverse effect of wave action on the stinger 12 which, by proper configuration of the columns and the weight and displacement of stinger 12, has excellent motion minimizing characteristics in the floating high draft condition.

It will be appreciated that a primary purpose of utilizing both a column stabilized stinger and a column stabilized pipelaying barge is to minimize the vertical heave motions of these floating structures due to wave action. Ideally, this is accomplished by submerging stinger 12 and barge 10 to approximately one half the effective height of the respective columns to preclude wave action against their respective base structures. The present pipelaying apparatus can accordingly operate efficiently in high sea conditions, for example, sea conditions having waves 11 to 12 feet in height or higher with minimum motion response to wave action. However, even when operating in the high draft condition with the motion minimizing characteristics afforded by the particular configuration of the pipelaying barge and column stabilized stinger, there is some response to wave action, i.e., the wave action against columns 18 and 70, 72 and 74. Because of this, when the natural period of the combined pipelaying barge and stinger is the same as or close to the period of the waves according to existent sea conditions, there is amplification of the motion of the entire pipelaying apparatus which may become so excessive as to interfere with pipelaying operations even though both the barge and stinger are semisubmerged to the usual operating condition with the mean waterline located at approximately one half the effective height $h$ of stabilizing columns 18 and 70, 72 and 74. It is therefore desirous to alter the motion of the apparatus when such motion amplification occurs and this can be accomplished by either ballasting or deballasting concurrently both the barge and stinger within certain predetermined limits to submerge or emerge the barge and stinger to a greater or lesser extent from the ideal submergence which locates the mean water surface at one half the effective height $h$. The maximum variation of submergence of the stinger from the ideal submergence by ballasting or deballasting the stinger is, however, limited to distances within a range which do not reorient the barge and stinger to positions wherein wave action there against causes excessive impact. Thus, to preclude excessive barge and stinger heave motion and impact caused by interaction of the barge and stinger with wave motion, a maximum variation, i.e., submergence or emergence of barge 10 and stinger 12 as by ballasting or deballasting, respectively from the ideal submergence of one half $h$, is such that the distance between the mean water surface and either the upper end of the columns 18 and 70, 72 and 74 or the topside of the hulls 16 and base structure 30 is not less than 0.75 of the mean wave height. It is thus significant that the foregoing barge and stinger have optimum stability characteristics in the floating semisubmerged or high draft condition.

It will thus be appreciated that stinger 12 provides adequate support for the pipeline as the latter is payed out from the pipelaying barge 10. Particularly, stinger 12 supports that length of pipeline which extends through the air from the elevated work area 28 on deck 24 adjacent the aft end of the pipelaying barge to the point of entry of the pipeline into the water in a manner which substantially precludes relative heave motion of stinger 12 and pipelaying barge 10. These features permit the work area 28 on which the pipe sections are connected one to the other and payed out from the barge to lie at an elevated position above the mean waterline for example, on the order of about 15 feet. Note that the air length of the pipeline between the work deck and its point of entry into the water is fully supported and that the pipeline obtains a radius of curvature in its transition from the work deck to the water well within the allowable radius of curvature whereby rupture of the pipeline is avoided.

It will be appreciated that stinger 12 also provides support for an immersed portion of the pipeline from its point of entry into the water at the mean waterline (about medially of the the length of stinger 12) to the aft end of the stinger whereby the use of articulated linkages, etc. employed in conventional stingers is entirely eliminated. Thus, stinger 12 serves to fully support the pipeline as it transitions through the air from an elevated position well above the mean waterline on the barge to a submerged position well below the mean waterline at the aft end of the stinger without the requirement of any additional supporting structure. Moreover, this is provided in a manner such that the pipeline, when supported by the stinger, obtains a radius of curvature well within the allowable radius of curvature whereby rupture of the pipeline is avoided.

It is a further particular feature hereof that the column stabilized stinger can be employed with barges of conventional construction and having elevated work areas or column stabilized barges of the type herein illustrated, that is, a column stabilized type barge as disclosed in application Ser. No. 705,175 of common assignee herewith. To this end, stinger 12 is constructed to obtain a specified natural period. When the pipeline portion is laid over the stinger and the stinger attached, this combination provides a known predetermined natural period. Note that this natural period can be altered by changing the submergence level to vary the draft and displacement of the stinger thereby obtaining a natural period of the stinger and pipeline combination which is adjustable to a limited extend within a predetermined range. The natural period of a pipelaying barge is known from its physical characteristics. By matching the natural period of the stinger including the pipeline carried thereby, with the pipelaying barge, that is, by particularly configuring the stinger and considering the weight of the pipeline to provide a natural period approximating the natural period of the barge with which the stinger will be utilized, it is possible to match their natural periods whereby substantially identical stinger and pipelaying barge response to wave action can be achieved. Where the combination of stinger and pipeline has a natural period which cannot be altered by variation in the submergence level by ballasting or deballasting to approximate the natural period of the pipelaying barge with which the vessel will be utilized, the stinger 12 can be constructed to obtain a natural period more nearly approximate to the natural period of the pipelaying barge by proper design of the cross section area of the columns, by altering its weight and displacement, its length and width configuration and other factors.

In the preferred embodiment hereof illustrated in FIGS. 1–10, particularly configured for employment with the column stabilized barge described and illustrated in my copending application Ser. No. 705,175 filed Feb. 13, 1968, stinger 12 has an overall length of about 178 feet and a beam from centerline to centerline of members 32 of about 20 feet. The centerlines of the members 32 at the aft end of a stinger 12 are about 9 feet apart whereas the corresponding portions at the forward end of stinger 12 are about 10 feet apart. The centerline of keel 38 depends a vertical distance of about 10 feet from a horizontal plane containing the centerlines of members 32. Members 32 preferably have outside diameters of 42 inches and stabilizing columns 70, 72 and 74 preferably have an outside diameter of about 20 inches. Columns 70 upstand from the centerlines of members 32 a distance of about 31 feet. Diagonal bracing 40 preferably has outside diameters of 2 feet while transversely extending members 36 have outside diameters of 30 inches. The centerlines of columns 70 are longitudinally spaced about 26 feet one from the other and are disposed symmetrically about the pitch axis. Anodes, not shown, are preferably disposed on the stinger to preclude corrosion.

Referring now to the embodiment hereof illustrated in FIGS. 11–13, there is disclosed a stinger 12a for use with a pipelaying barge 10a of a type similar to that disclosed in my copending application Ser. No. 705,175 filed Feb. 13, 1968, wherein the work area for assembling and paying out pipe sections from the barge is disposed along the longitudinal centerline of the pipelaying barge rather than along one side thereof as disclosed in the embodiment hereof illustrated in FIGS. 1–10 hereof. The stinger in this form is similar to the stinger described and illustrated with respect to FIGS. 1–10 hereof and like reference numerals are applied with the parts in this form being designated by a letter $a$ following the reference numeral.

The base structure 30a of stinger 12a is substantially identical with the base structure 30 previously described except that the members 32a constituting the forward portion of stinger 12a lie in spaced parallel relation one to the other rather than converged inwardly toward one another as in the previous embodiment. The keel 38a extends forwardly to the forwardmost portion of stinger 12a and suitable diagonal bracing 40a and vertically extending bracing interconnect keel 38a with the longitudinal members 32a.

At the forward end of stinger 12a there is provided a pair of members 100 connected to the forward ends of members 32a, members 100 lying in a common plane with members 32a and diverging outwardly in a forward direction for connection with a transverse member 102. Also, a member 104 connects with the forward end of keel 38a and extends upwardly for connection with member 102. Hinge mounts 106 are provided on the opposite ends of member 102 for hingedly connecting stinger 12a to the hulls 16a barge 10a. Specifically, barge 10a includes a pair of vertically extending plates 108 disposed on the inboard sides at the aft ends of each of hulls 16a. Plates 108 have a series of vertically spaced openings and hinge pins couple hinge mountings 106 to plates 108 at selected elevations therealong whereby stinger 12a is pivotally connected to barge 10a.

In this form, there is provided a central tunnel between decks 22a and 24a for assembling and paying out pipeline onto the centrally disposed stinger 12a. An opening is provided through the upper deck 22a adjacent the forward end of barge 10a whereby pipe sections carried on deck 22a can be lowered into the pipe assembly area on lower deck 24a by the cranes. By disposing stinger 12a along the extended centerline of barge 10a, the stinger and hence the pipeline carried thereby is less susceptible to roll motions than in the form previously described. Balanced forces also act on the stinger in this stinger-barge configuration. As in the previous form, stinger 12a supports the pipeline issuing from barge 10a as the pipeline makes the transition through the air from the aft end of barge 10a to its point of entry into the water and also supports an immersed portion of the pipeline from the point of entry in the water to the aft end of stinger 12a. Thus, additional stinger segments or articulated linkages as are commonly employed in the prior art are eliminated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A flotation member for laying pipeline on an underwater surface from a floating vessel having a pipeline work deck elevated above the mean waterline comprising;

an elongated base structure comprised of a pair of transversely spaced hulls, at least a portion of said hulls converging toward one another in one of the fore and aft directions;

a plurality of elements upstanding from said hulls with at least a portion of said elements comprised of a plurality of stabilizing columns located on opposite sides of the pitch and roll axes of the member;

means for submerging said base structure and portions of said upstanding elements below the waterline to obtain a high draft floating condition, the displacement of the submerged base structure and portions of said upstanding elements being sufficient to maintain the member buoyant in a pipeline portion supporting condition with the mean waterline located intermediate the height of said columns;

coupling means carried by said base structure adjacent its forward end for pivotally coupling the flotation member to the pipelaying vessel;

and means carried by said flotation member for supporting a portion of a pipeline for translational movement therealong, said pipeline support means being located above said base structure at elevations of decreasing height relative to said base structure in a forward to aft direction along said flotation member, the pipeline support means being adapted to receive pipeline payed out from the elevated work deck of the pipelaying vessel.

2. Apparatus according to claim 1 including means for varying the submergence of the flotation member in the high draft condition to alter the natural period of the flotation member to preclude amplification of flotation member motion due to interaction of wave and flotation member motion.

3. Apparatus according to claim 1 wherein said stabilizing columns have a substantially uniform cross-sectional area throughout their height.

4. Apparatus according to claim 1 wherein said submerging means includes means for ballasting and deballasting said base structure.

5. Apparatus according to claim 4 wherein each of said hulls include a plurality of compartments, valve means associated with said compartments for introducing water ballast into and expelling water ballast from said compartments.

6. Apparatus according to claim 1 wherein said support means comprises a plurality of rollers disposed at longitudinally spaced positions along said stinger and lying substantially coincident with the longitudinal centerline of the stinger.

7. Apparatus according to claim 6 wherein at least a pair of said columns are carried by each of said hulls, a plurality of support struts extending between laterally adjacent columns, said rollers being disposed on said support struts.

8. Apparatus according to claim 1 including said vessel, said coupling means coupling said flotation member to the aft end of said vessel to position the flotation member for receiving pipeline payed out from said vessel.

9. Apparatus according to claim 8 wherein said vessel has a work area adjacent one side of the vessel for assembling pipe sections, said member being coupled to said vessel to lie in substantial longitudinal alignment with said one vessel side.

10. Apparatus according to claim 8 wherein said vessel has a work area substantially along the centerline of said vessel, said member being coupled to said vessel such that the centerlines of said vessel and said member lie in substantial longitudinal alignment one with the other.

11. Apparatus according to claim 8 wherein said vessel includes a base structure and a plurality of columns upstanding from said base structure, and means for ballasting and deballasting said vessel between high and low draft conditions, said vessel being column stabilized in the high draft condition.

12. Apparatus according to claim 11 wherein said vessel has a work area adjacent one side thereof for assembling pipe sections, said vessel hull structure including a pair of elongated hulls spaced one from the other on opposite sides of said vessel, and means carried by the aft portion of the one hull on the same side of said vessel as said work area and cooperable with said coupling means on said stinger for releasably connecting said flotation member to said vessel.

13. Apparatus according to claim 11 wherein said vessel has a work area substantially along the centerline of said vessel for assembling pipe sections, said vessel hull structure including a pair of elongated hulls spaced one from the other on opposite sides of said vessel, and means carried by the aft portions of said hulls and cooperable with said coupling means on said flotation member for releasably connecting said flotation member to said vessel.

14. Apparatus according to claim 8 wherein the natural period of said flotation member and the pipeline portion carried thereby substantially match the natural frequency of said vessel.

15. Apparatus according to claim 8 wherein said vessel and said flotation member and pipeline portion carried thereby have predetermined natural periods, and means for selectively ballasting and deballasting the stinger to substantially match the natural period of the stinger and pipeline portion carried thereby with the natural period of the vessel.

16. Apparatus according to claim 1 wherein at least a pair of said columns are carried by each of said hulls, said base structure being configured to float the member in a low draft condition with the base structure having freeboard, said submerging means including means for ballasting said hull members to change the draft of the members from said low draft condition to said high draft condition.

17. Apparatus according to claim 1 wherein said base structure includes a keel spaced below said hulls, and means connecting said hulls and said keel one to the other.

18. Apparatus for laying pipeline on an underwater surface comprising;
 a floating vessel having a pipeline work deck elevated above the mean waterline;
 a flotation member having an elongated base structure;
 a plurality of elements upstanding from said base structure with at least a portion of said elements comprised of a plurality of stabilizing columns located on opposite sides of the pitch and roll axes of said flotation member;
 means for submerging said base structure and portions of said upstanding elements below the waterline to obtain a high draft floating condition, the displacement of the submerged base structure and portions of said upstanding elements being sufficient to maintain the flotation member buoyant in a pipeline portion supporting condition with the mean waterline located intermediate the height of said columns;
 means carried by said base structure adjacent its forward end pivotally coupling said pipelaying vessel and said flotation member one to the other;
 and means carried by said flotation member for supporting a portion of a pipeline for translational movement therealong, said pipeline support means being located above said base structure at elevations of decreasing height relative to said base structure in a forward to aft direction along said flotation member, the pipeline support means being adapted to receive pipeline payed out from the elevated work deck of said vessel;
 said flotation member comprising the sole means for supporting the pipeline as it is payed out from said vessel.

* * * * *